US006460340B1

(12) United States Patent
Chauvette et al.

(10) Patent No.: US 6,460,340 B1
(45) Date of Patent: Oct. 8, 2002

(54) FUEL NOZZLE FOR GAS TURBINE ENGINE AND METHOD OF ASSEMBLING

(75) Inventors: Claude H. Chauvette; Narendra D. Joshi, both of Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/466,557

(22) Filed: Dec. 17, 1999

(51) Int. Cl.[7] .................................................. F02C 1/00

(52) U.S. Cl. .................... 60/740; 239/123.3; 29/890.02

(58) Field of Search ................ 60/740, 734; 239/132.3, 239/132.5; 29/890.02

(56) References Cited

U.S. PATENT DOCUMENTS 2,762,656 A * 9/1956 Fraser ........................ 299/120
2,836,234 A * 5/1958 Sage .......................... 158/116
5,190,224 A * 3/1993 Hamilton .................... 239/600
5,570,580 A 11/1996 Mains .......................... 60/747
5,761,907 A * 6/1998 Pelletier ...................... 60/740
6,003,781 A * 12/1999 Kwan ...................... 239/123.3

FOREIGN PATENT DOCUMENTS

FR 985652 7/1951
GB 2328386 2/1999

* cited by examiner

*Primary Examiner*—Ehud Gartenberg
(74) *Attorney, Agent, or Firm*—William Scott Andes; Armstrong Teasdale LLP

(57) ABSTRACT

A fuel nozzle for a gas turbine engine has a spray tip and a housing coaxially disposed around the spray tip. Bi-directional axial movement of the spray tip relative to the housing is constrained by first and second rows of tabs formed on one of the housing and the spray tip and a third row of tabs formed on the other one of the housing and the spray tip. The third row of tabs is disposed between the first and second rows to constrain spray tip motion in either axial direction.

23 Claims, 4 Drawing Sheets

FUEL NOZZLE FOR GAS TURBINE ENGINE AND METHOD OF ASSEMBLING

BACKGROUND OF THE INVENTION

This invention relates generally to gas turbine engines and more particularly to a fuel nozzle for supplying fuel to the combustor of such engines.

A gas turbine engine includes a compressor that provides pressurized air to a combustor wherein the air is mixed with fuel and burned for generating hot combustion gases. These gases flow downstream to one or more turbines that extract energy therefrom to power the compressor and provide useful work such as powering an aircraft in flight. In combustors used with aircraft engines, the fuel is supplied to the combustor through fuel nozzles positioned at one end of the combustion zone. A fuel nozzle typically includes a spray tip for precisely spraying fuel into a surrounding assembly, known as a swirler. The swirler also receives compressed air from the compressor and imparts a swirling motion to the air, thereby thoroughly mixing the fuel and air for combustion.

Because the fuel nozzle is located in the compressor discharge gas stream, it is exposed to relatively high temperatures. The presence of high temperatures around the fuel nozzle can cause the fuel passing through the nozzle fuel tube to form granules of carbon on the inner walls thereof. The carbon or coke formation in the fuel tube may cause the fuel nozzle to become clogged. Excessive temperatures can also cause the fuel in the fuel nozzle to gum up, thereby further causing the fuel nozzle to become clogged. In addition, if the fuel becomes overheated, it may begin to vaporize in the inner passageway, thereby resulting in intermittent or non-continuous fuel delivery to the combustor.

Consequently, conventional fuel nozzles typically include a heat shield in the form of a tubular housing that surrounds the fuel tube and spray tip so as to define an annular air gap therebetween. The air gap, or nozzle cavity, serves as a thermal barrier to protect the fuel in the fuel tube against coking.

During engine operation, the temperature of the housing is greater than the temperature of the fuel tube resulting in differential thermal expansion. This differential growth can cause the spray tip to be axially displaced from its proper positioning with respect to the housing. Operational risks such as nozzle cavity over-pressurization and carbon jacking (i.e., the build-up of hard carbon on nozzle internal surfaces) can also lead to axial displacement of the spray tip relative to the housing.

Such axial displacement can cause variations of the fuel spray impingement location in the swirler, which could impair the combustor exit temperature profile, engine emissions and engine start capability. Spray tip misalignment can also reduce the service life of the fuel nozzle, as well as the combustor, thereby increasing repair and maintenance costs. One known approach to preventing axial displacement is to use mechanical stops in the spray tip region to prevent axial motion of the spray tip in the aft direction. However, this approach does not address axial movement in the forward direction, which can also produce the above-mentioned problems.

Accordingly, there is a need for a fuel nozzle that maintains the proper axial positioning of the spray tip relative to the housing in both the forward and aft directions.

SUMMARY OF THE INVENTION

The above-mentioned need is met by the present invention which provides a fuel nozzle having a spray tip and a housing coaxially disposed around the spray tip. The fuel nozzle further includes a means for constraining bi-directional axial movement of the spray tip relative to the housing. The means for constraining bi-directional axial movement of the spray tip preferably includes first and second tabs formed on one of the housing and the spray tip and a third tab formed on the other one of the housing and the spray tip. The third tab is disposed between the first and second tabs to constrain bi-directional axial movement.

The present invention and its advantages over the prior art will become apparent upon reading the following detailed description and the appended claims with reference to the accompanying drawings.

DESCRIPTION OF THE DRAWINGS

The subject matter which is regarded as the invention is particularly pointed out and distinctly claimed in the concluding part of the specification. The invention, however, may be best understood by reference to the following description taken in conjunction with the accompanying drawing figures in which:

DETAILED DESCRIPTION OF THE INVENTION

Figure 1:
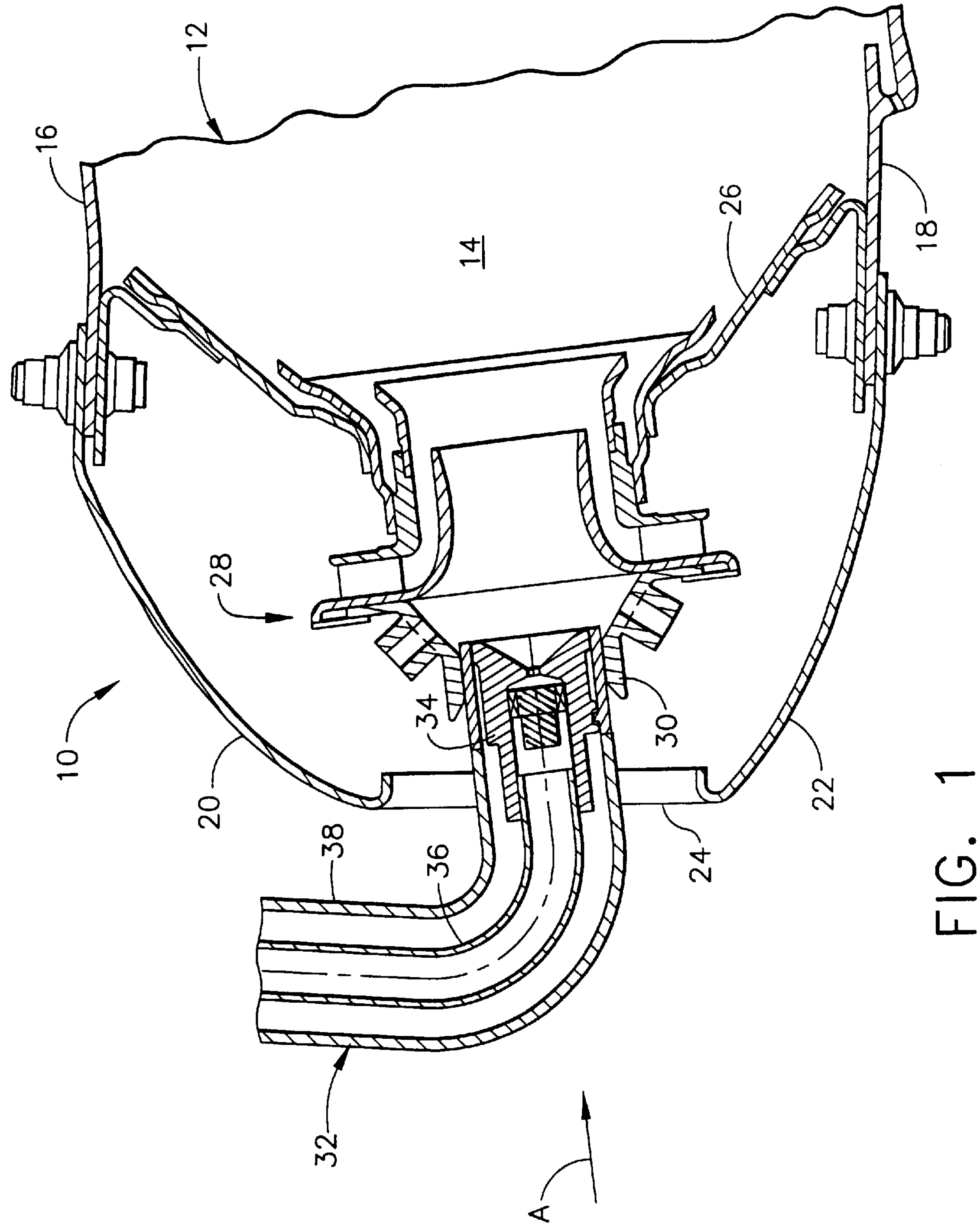
FIG. 1 is an axial sectional view of the forward portion of a combustor having the fuel nozzle of the present invention.

Referring to the drawings wherein identical reference numerals denote the same elements throughout the various views, FIG. 1 shows the forward end of a combustor 10 of the type suitable for use in a gas turbine engine and including a hollow body 12 defining a combustion chamber 14 therein. The hollow body 12 is generally annular in form and is defined by an outer liner 16 and an inner liner 18. The upstream end of the hollow body 12 is substantially closed off by an outer cowl 20 attached to the outer liner 16 and an inner cowl 22 attached to the inner liner 18. An annular opening 24 is formed by the outer and inner cowls 20 and 22 for the introduction of fuel and compressed air. The compressed air is introduced into the combustor 10 from a compressor (not shown) in a direction generally indicated by arrow A of FIG. 1. The compressed air passes primarily through the opening 24 to support combustion and partially into the region surrounding the hollow body 12 where it is used to cool both the liners 16 and 18 and turbomachinery further downstream.

It should be understood that although FIG. 1 illustrates one preferred embodiment of a single annular combustor, the present invention is equally applicable to other types of combustors, including double annular combustors and cannular combustors.

Disposed between and interconnecting the outer and inner liners 16 and 18 near their upstream ends is an annular dome plate 26. A plurality of circumferentially spaced swirler assemblies 28 (one shown in FIG. 1) is mounted in the dome plate 26. The forward end of each swirler assembly 28 includes a ferrule 30 that coaxially receives a corresponding fuel nozzle 32. Each fuel nozzle 32 includes a spray tip 34 disposed in the ferrule 30, a fuel tube 36 connected to the spray tip 34, and a substantially tubular housing 38 enclosing the spray tip 34 and the fuel tube 36. Fuel is carried through the fuel tube 36 to the spray tip 34 and discharged therefrom. The swirler assemblies 28 swirl air received via the annular opening 24. The swirling air interacts with fuel discharged from the spray tip 34 so that a thoroughly mixed fuel/air mixture flows into the combustion chamber 14.

Figure 2:
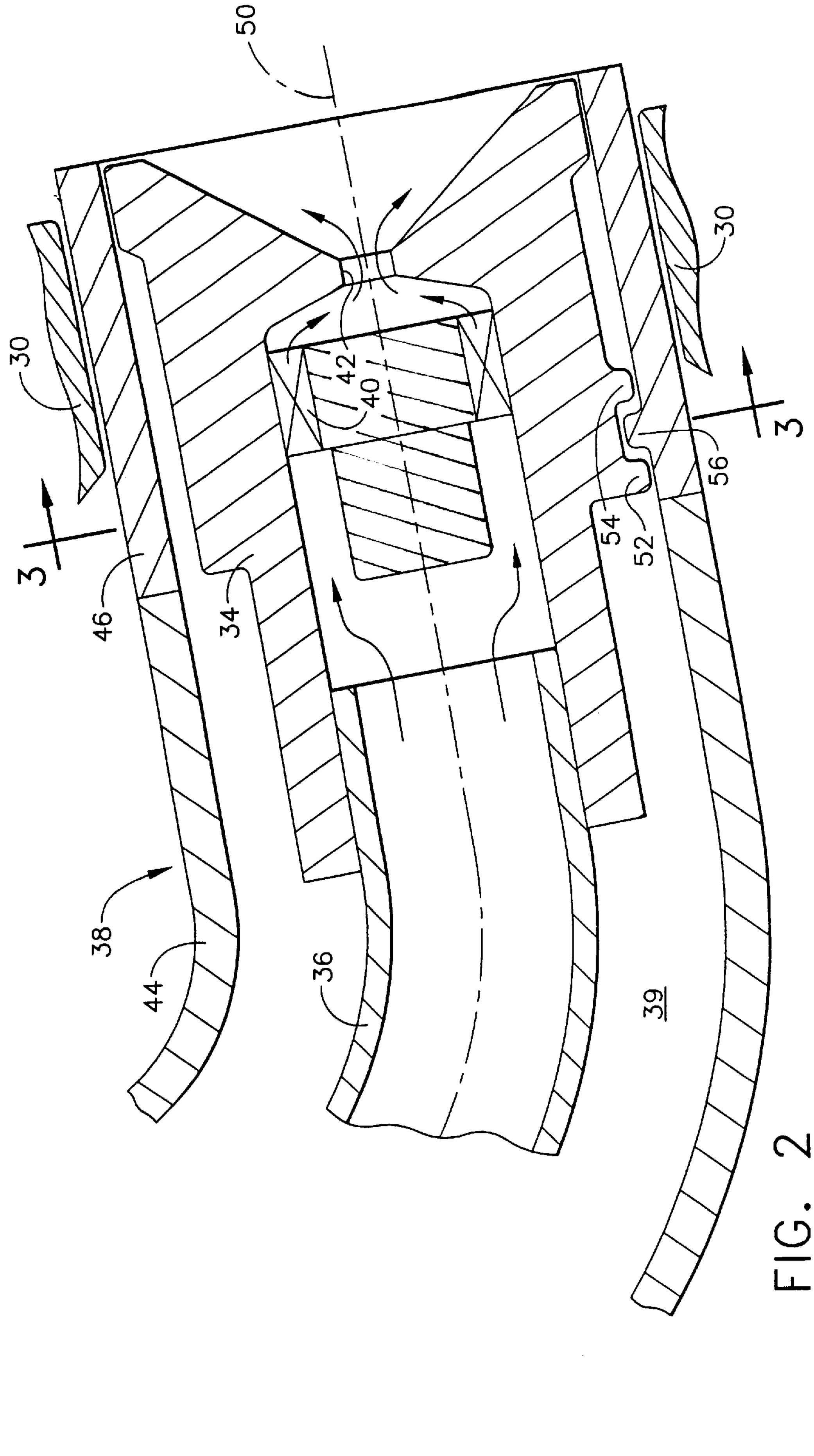
FIG. 2 is an enlarged sectional view of a portion of the fuel nozzle of FIG. 1.

Referring now to FIG. 2, a first embodiment of the present invention is shown in detail. One end of the fuel tube 36 is inserted into a central opening in the forward end of the spray tip 34, which is substantially cylindrical in shape. As is known in the art, a fuel swirler 40 is disposed inside of the spray tip 34, downstream of the end of the fuel tube 36. An orifice 42 is formed in the aft end of the spray tip 34. In this configuration, fuel is introduced through the fuel tube 36, swirled by the swirler 40, and then sprayed through the orifice 42. The configuration of the spray tip 34 as described thus far is merely one exemplary configuration used to illustrate the inventive concept. It should be understood that the present invention is not limited to fuel nozzles having this particular type of spray tip.

The inner radius of the housing 38 is sufficiently large so as to define an annular air gap or nozzle cavity 39 between the housing 38 and the fuel tube 36 and spray tip 34. The housing 38 and the nozzle cavity 39 thus serve to protect the fuel tube 36 from the high temperatures to which the fuel nozzle 32 is exposed. The housing 38 includes a primary section 44 and a wear sleeve 46 attached to the distal end of the primary section 44 by any suitable means such as welding or brazing. The wear sleeve 46 is arranged coaxially (about a central axis 50) within the ferrule 30, and the rear portion of the spray tip 34 is arranged coaxially within the wear sleeve 46.

A first row of tabs 52 is formed on the outer cylindrical surface of the spray tip 34. The first tabs 52 are located about the circumference of the spray tip 34 at the same axial position with respect to the central axis 50 and extend radially outwardly from the spray tip 34. Similarly, a second row of outwardly extending tabs 54 is formed on the outer cylindrical surface of the spray tip 34 at a common axial position, which is spaced axially downstream from the first row of tabs 52. Although all tabs are preferably integrally formed with the spray tip 34, the term "formed on" is used herein to mean separately attached as well as integrally formed. Each of the two rows comprises an identical number of tabs, with corresponding tabs from each row being circumferentially aligned. That is, each second tab 54 is at the same circumferential location on the spray tip 34 as a corresponding one of the first tabs 52 so as to define an axial gap therebetween.

A third row of tabs 56 is formed on the inner cylindrical surface of the wear sleeve 46. The third tabs 56 extend radially inwardly from the wear sleeve inner surface and are all located at a common axial position, which is situated between the axial positions of the first row of tabs 52 and the second row of tabs 54. The number of third tabs 56 is preferably equal to the number of first and second tabs 52 and 54. When the fuel nozzle 32 is assembled, each one of the third tabs 56 is disposed in a corresponding one of the gaps defined between the first and second tabs 52 and 54.

There will be some axial space between each third tab 56 and the corresponding first and/or second tab 52 and 54 due to manufacturing tolerances. Thus, the configuration allows for normal or expected thermal growth of the housing 38 relative to the spray tip 34, axially and radially. However, the spray tip 34 is prevented from more than nominal movement with respect to the housing 38 in both the forward and aft axial directions that may be caused by excessive thermal growth, carbon jacking or other reasons. That is, the three rows of tabs 52, 54, 56 interact so as to constrain bi-directional axial movement of the spray tip 34 relative to the housing 38, thereby maintaining the proper axial positioning of the spray tip 34 with respect to the housing 38. Proper positioning of the spray tip 34 will reduce variation of fuel spray impingement location in the swirler assembly 28. This will result in improved performance and durability of the fuel nozzle 32 and the combustor 10.

Figure 3:
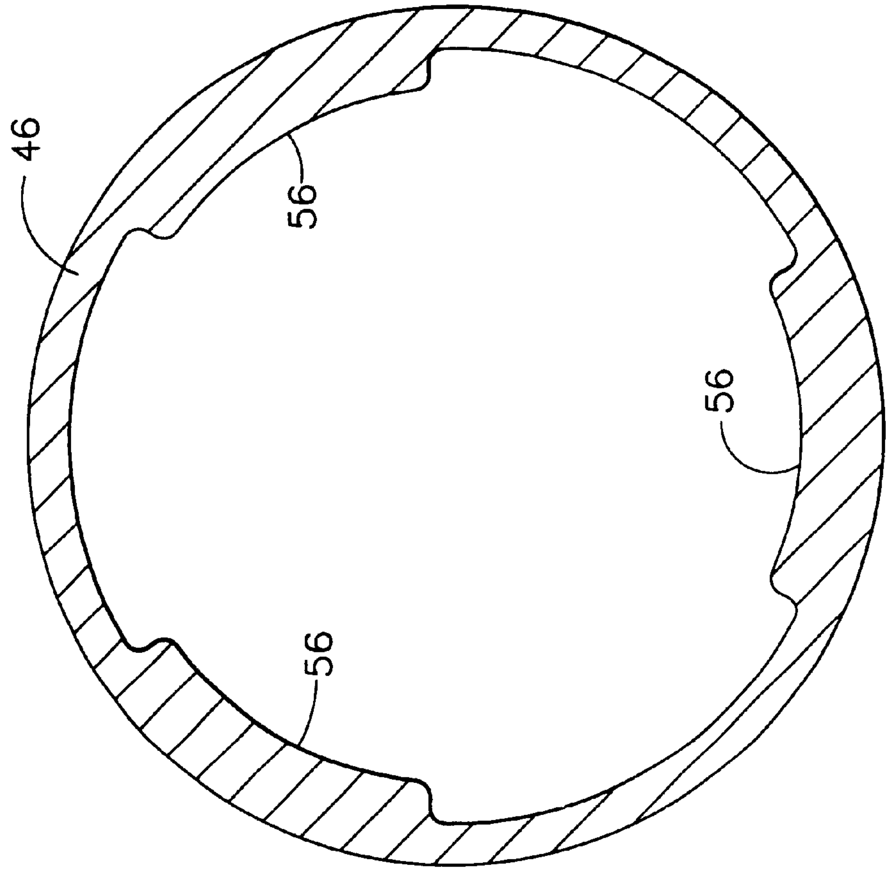
FIG. 3 is a sectional view of the fuel nozzle housing taken along the line 3—3 of FIG. 2.

As seen in FIG. 3, the third row contains three tabs 56 that are each approximately 60 degrees in width and are spaced equally around the circumference of the wear sleeve 46. Three spaces, which are also approximately 60 degrees in width, are accordingly defined between the tabs 56. The first and second tabs 52 and 54 are similarly configured on the spray tip 34. This arrangement permits assembly of the fuel nozzle 32 by placing the wear sleeve 46 over the aft end of the spray tip 34 and inserting the third tabs 56 through the circumferential spaces defined between the second tabs 54 so that the third tabs 56 are located at their axial position between the first and second tabs 52 and 54. The wear sleeve 46 is then rotated 60 degrees relative to the spray tip 34 so that each third tab 56 is disposed in a corresponding one of the gaps defined between the first and second tabs 52 and 54. Once it is properly positioned, the wear sleeve 46 is securely fixed to the primary section 44 of the housing 38. This prevents subsequent relative rotation of the spray tip 34 and the wear sleeve 46 so that all three rows of tabs 52, 54, 56 will remain circumferentially aligned.

Although the present invention is depicted in FIG. 3 as having three third tabs 56 (and hence three first and second tabs 52 and 54), it should be noted that the number of tabs per row is not limited to three. However, it is preferred that each tab row comprises two or more tabs. Although the present invention would theoretically work with one tab per row, using at least two equally spaced tabs per row will prevent any cocking of the spray tip 34 within the wear sleeve 46 that would result from a moment generated by unequal loads acting on the fuel nozzle 32.

Figure 4:
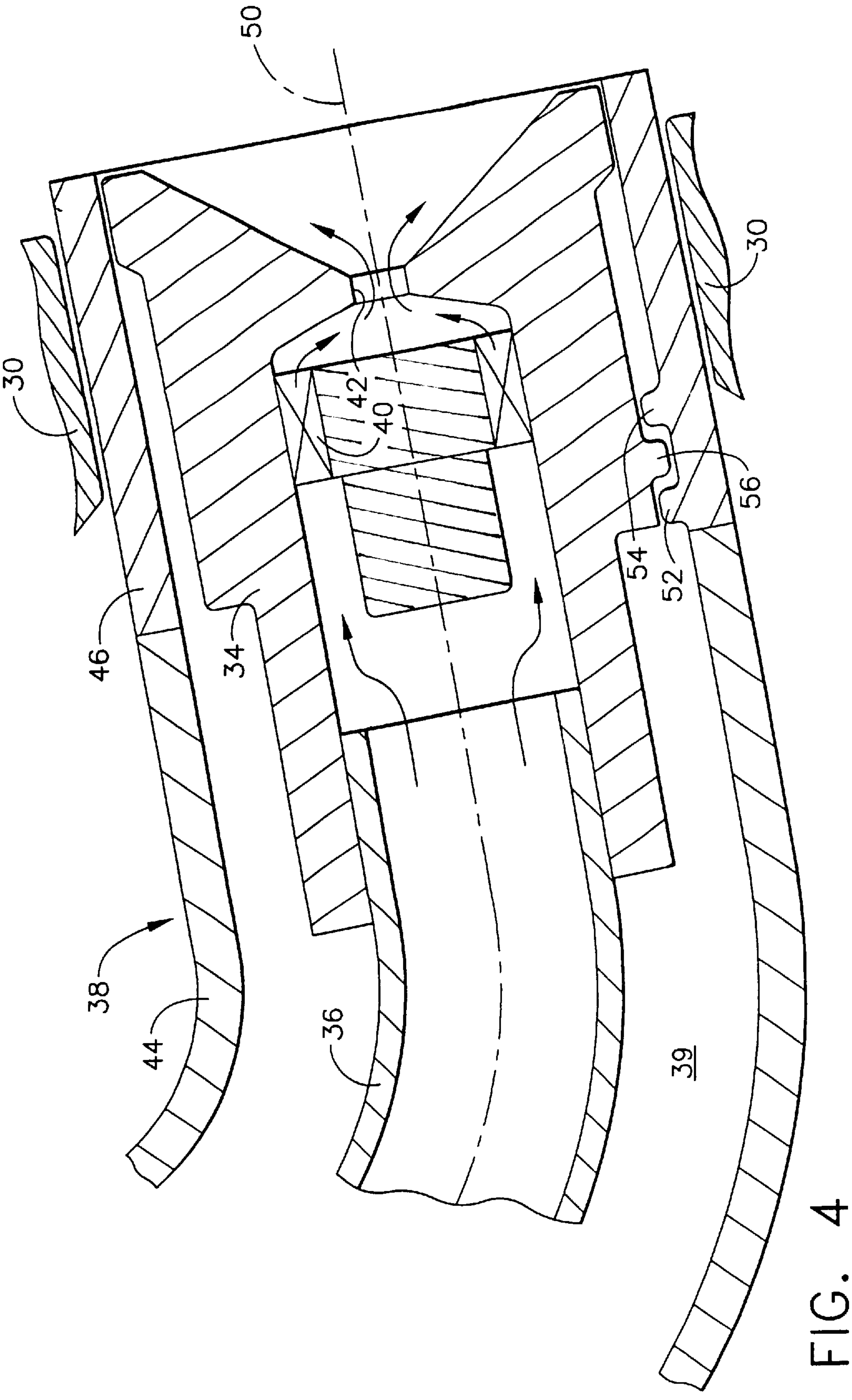
FIG. 4 is an enlarged sectional view showing a portion of a fuel nozzle of an alternative embodiment of the present invention.

FIG. 4 illustrates an alternative embodiment of the present invention. This embodiment functions in the same manner as the first embodiment, but the first row of tabs 52 and second row of tabs 54 are formed on the inner cylindrical surface of the wear sleeve 46 and extend radially inwardly therefrom. The third row of tabs 56 is formed on the outer cylindrical surface of the spray tip 34, and these tabs 56 extend radially outwardly therefrom. As before, the first tabs 52 are all located at a common axial position with respect to the central axis 50, and the second tabs 54 are all located at another common axial position, which is spaced axially downstream from the first row of tabs 52. The third tabs 56 are all located at yet another common axial position, which is situated between the axial positions of the first row of tabs 52 and the second row of tabs 54. Each one of the third tabs 56 is disposed in a corresponding one of the gaps defined between the first and second tabs 52 and 54. As in the first embodiment, this configuration constrains bi-directional axial movement of the spray tip 34 relative to the housing 38 so as to maintain proper axial positioning, while allowing for normal or expected thermal growth of the housing 38 relative to the spray tip 34, both axially and radially.

The foregoing has described a fuel nozzle in which bi-directional axial movement of the spray tip relative to the housing is constrained. While specific embodiments of the present invention have been described, it will be apparent to those skilled in the art that various modifications thereto can be made without departing from the spirit and scope of the invention as defined in the appended claims.

What is claimed is:

1. A fuel nozzle comprising:

a spray tip;

a housing disposed around said spray tip, said housing surrounding the entire axial extent of said spray tip, said housing surrounding the entire axial extent of said spray tip;

first and second tabs formed on one of said housing and said spray tip; and a third tab formed on the other one of said housing and said spray tip, said third tab being disposed between said first and second tabs.

2. The fuel nozzle of claim 7 wherein said housing is coaxially disposed around said spray tip.

3. The fuel nozzle of claim 8 wherein said first and second tabs are formed on said spray tip and said third tab is formed on said housing.

4. The fuel nozzle of claim 9 wherein said first and second tabs are spaced axially.

5. The fuel nozzle of claim 9 wherein said first, second and third tabs are circumferentially aligned.

6. The fuel nozzle of claim 8 wherein said first and second tabs are formed on said housing and said third tab is formed on said spray tip.

7. The fuel nozzle of claim 12 wherein said first and second tabs are spaced axially.

8. The fuel nozzle of claim 12 wherein said first, second and third tabs are circumferentially aligned.

9. The fuel nozzle of claim 8 wherein there is a space between said third tab and said first and second tabs.

10. A fuel nozzle comprising:

a fuel tube;

a spray tip connected to one end of said fuel tube and defining a central axis;

a housing coaxially disposed around said spray tip, said housing surrounding the entire axial extent of said spray tip;

a first row of tabs formed on one of said housing and said spray tip;

a second row of tabs formed on said one of said housing and said spray tip, said second row of tabs being spaced axially from said first row of tabs; and a third row of tabs formed on the other one of said housing and said spray tip, each tab of said third row of tabs being disposed between a tab from said first row of tabs and a tab from said second row of tabs.

11. The fuel nozzle of claim 16 wherein first and second rows of tabs are formed on said spray tip and said third row of tabs is formed on said housing.

12. The fuel nozzle of claim 17 wherein said housing comprises a primary section and a wear sleeve, said third row of tabs being formed on said wear sleeve.

13. The fuel nozzle of claim 18 wherein each tab of said first row of tabs is spaced equally around said spray tip, each tab of said second row of tabs is spaced equally around said spray tip, and each tab of said third row of tabs is spaced equally around said wear sleeve.

14. The fuel nozzle of claim 16 wherein said first and second rows of tabs are formed on said housing and said third row of tabs is formed on said spray tip.

15. The fuel nozzle of claim 20 wherein said housing comprises a primary section and a wear sleeve, said first and second rows of tabs being formed on said wear sleeve.

16. The fuel nozzle of claim 21 wherein each tab of said first row of tabs is spaced equally around said wear sleeve, each tab of said second row of tabs is spaced equally around said wear sleeve, and each tab of said third row of tabs is spaced equally around said spray tip.

17. The fuel nozzle of claim 17 wherein there is a space between each tab of said third row of tabs and the corresponding tabs of said first and second rows of tabs.

18. A fuel nozzle for a gas turbine combustor including a ferrule, comprising:

a fuel tube;

a spray tip connected to one end of said fuel tube and defining a central axis;

a housing coaxially disposed around said spray tip and surrounding the entire axial extent of said spray tip, said housing comprising a primary section and a wear sleeve, said wear sleeve adapted to be received in said ferrule;

a first row of tabs formed on one of said housing and said spray tip;

a second row of tabs formed on said one of said housing and said spray tip, said second row of tabs being spaced axially from said first row of tabs; and a third row of tabs formed on the other one of said housing and said spray tip, each tab of said third row of tabs being disposed between a tab from said first row of tabs and a tab from said second row of tabs.

19. The fuel nozzle of claim 18 wherein first and second rows of tabs are formed on said spray tip and said third row of tabs is formed on said housing.

20. The fuel nozzle of claim 19 wherein said third row of tabs are formed on said wear sleeve.

21. The fuel nozzle of claim 20 wherein each tab of said first row of tabs is spaced equally around said spray tip, each tab of said second row of tabs is spaced equally around said spray tip, and each tab of said third row of tabs is spaced equally around said wear sleeve.

22. The fuel nozzle of claim 18 wherein said first and second rows of tabs are formed on said housing and said third row of tabs is formed on said spray tip.

23. The fuel nozzle of claim 19 wherein there is a space between each tab of said third row of tabs and the corresponding tabs of said first and second rows of tabs.

* * * * *

UNITED STATES PATENT AND TRADEMARK OFFICE
CERTIFICATE OF CORRECTION

PATENT NO. : 6,460,340 B1 
DATED : October 8, 2002
INVENTOR(S) : Chauvette et al.

It is certified that error appears in the above-identified patent and that said Letters Patent is hereby corrected as shown below:

Column 5,
Line 17, delete "7" and insert therefor -- 1 --
Lines 19, 26 and 33, delete "8" and insert therefor -- 2 --
Lines 22 and 24, delete "9" and insert therefor -- 3 --.
Lines 29 and 31, delete "12" and insert therefor -- 6 --.
Line 52, delete "16" and insert therefor -- 10 --.
Line 55, delete "17" and insert therefor -- 11 --.

Column 6,
Line 1, delete "18" and insert therefor -- 12 --.
Line 6, delete "16" and insert therefor -- 10 --.
Line 9, delete "20" and insert therefor -- 14 --.
Line 12, delete "21" and insert therefor -- 15 --.
Line 17, delete "17" and insert therefor -- 11 --.

Signed and Sealed this

Twelfth Day of April, 2005

JON W. DUDAS
*Director of the United States Patent and Trademark Office*